United States Patent [19]

Skarvada

[11] 4,184,203
[45] Jan. 15, 1980

[54] WHEEL SPEED SENSING SYSTEM

[75] Inventor: Thomas Skarvada, Woodland Hills, Calif.

[73] Assignee: Crane Co., Chicago, Ill.

[21] Appl. No.: 953,126

[22] Filed: Oct. 20, 1978

[51] Int. Cl.[2] .......................... G06F 15/20; B60T 8/00
[52] U.S. Cl. ..................................... 364/426; 364/565; 303/103
[58] Field of Search ................. 364/426, 565; 303/91, 303/20, 105, 106, 103; 324/160, 161, 166; 361/236, 240; 180/105 E

[56] References Cited

U.S. PATENT DOCUMENTS

| | | | |
|---|---|---|---|
| 3,724,916 | 4/1973 | Hirzel | 303/20 X |
| 3,806,205 | 4/1974 | Hida et al. | 364/426 X |
| 3,833,268 | 9/1974 | Fleagle | 303/20 X |
| 3,915,508 | 10/1975 | Grosseau | 303/20 X |
| 3,937,525 | 2/1976 | Luhdorff et al. | 364/426 X |
| 3,943,345 | 3/1976 | Ando et al. | 364/426 X |
| 3,998,496 | 12/1976 | Bernabo et al. | 303/106 |
| 4,036,536 | 7/1977 | Quon | 303/96 |
| 4,040,677 | 8/1977 | Bleckmann | 303/95 |
| 4,056,287 | 11/1977 | Gudat | 364/426 X |
| 4,060,285 | 11/1977 | Jones | 303/106 |
| 4,073,545 | 2/1978 | Takeuchi et al. | 303/109 |
| 4,125,295 | 11/1978 | Ruhnau et al. | 364/426 X |

Primary Examiner—Edward J. Wise
Attorney, Agent, or Firm—Hume, Clement, Brinks, Willian & Olds, Ltd.

[57] ABSTRACT

A wheel speed sensing system for a brake control system is characterized in that the periodic signal generated by a wheel speed transducer is used to trigger a series of digital signals having a frequency proportional to that of the periodic transducer signal. Clock signals are counted between a selected pair of digital signals to provide a digital measure of the time interval separating the digital signals and hence the period of the periodic signal. In a preferred embodiment the number of intervening digital signals separating the selected pair of digital signals is automatically chosen to maintain the time resolution of the measurement above a preselected value.

11 Claims, 5 Drawing Figures

WHEEL SPEED SENSING SYSTEM

BACKGROUND OF THE INVENTION

The present invention relates to a wheelspeed sensing system for use in a brake control system and more particularly to a means for digitally measuring the period of a periodic signal having a period related to wheelspeed.

One important class of modern brake control systems monitors the rotation of one or more wheels and modifies the braking force applied to the wheel as necessary for proper braking. Such brake control systems are in widespread use in commercial and military aircraft, and are in growing use in business aircraft and ground transportation vehicles. In use, these systems provide improved braking control and reduced stopping distances, and as such, they are important safety components of many modern vehicles.

One of the central elements of this type of brake control system is the wheelspeed transducer and associated circuitry. An accurate measure of wheelspeed is an important first step in detecting and then controlling braking conditions such as wheel skid. In the past, many brake control systems have relied on analog circuits to generate an analog parameter representative of wheelspeed. For example, one approach used in the past has been to process the periodic output signal of a wheelspeed transducer to generate a series of impulse signals which correspond in frequency with the periodic signal produced by the transducer. The impulse signals are then applied to an electrical charge integrator, such as a capacitor, and the voltage on the capacitor is used as a measure of wheel velocity.

The prior art analog approach exhibits certain limitations and drawbacks. In that the impulse signals are integrated, multiple periods of the transducer signal are often required to accurately indicate changing wheelspeed. Furthermore, this approach utilizes analog circuits which are subject to inaccuracies due to drift under certain circumstances. Moreover, these analog approaches are not well suited for use with brake control systems employing digital processors. The analog wheelspeed value must be digitized before it can be input into a digital processor, and the time delays required for precision analog to digital conversion can be a drawback in some applications.

SUMMARY OF THE INVENTION

The present invention is directed to an improved wheel speed sensing system for use with brake control systems. This wheel spped sensing system avoids many of these and other drawbacks of the prior art by employing digital timing techniques to digitally measure the period of a signal having a period related to wheelspeed. By measuring this period, information is obtained regarding wheelspeed, which is proportional to the inverse of the measured period. As used herein, the term "wheelspeed" is sometimes used to refer to a measure of the period of a signal having a frequency related to wheelspeed.

The wheel speed sensing system of this invention includes means for generating a substantially periodic signal having a frequency related to wheelspeed. This periodic signal is processed to generate a series of digital signals having a period related to that of the periodic signal, which digital signals are supplied as inputs to a counting means. Clock means are provided for generating a series of clock signals which are also supplied as inputs to the counting means. The counting means operates to count the number of clock signals which are generated between a pair of digital signals, and thereby to measure the elapsed time separating the pair of digital signals. In this way a digital measure of the period of the original periodic signal is obtained.

A preferred embodiment of this wheel speed sensor includes means for selecting the number of intervening digital signals falling between the timed pair of digital signals in order to maintain the measure elapsed time within a preferred range as the wheel speed varies. For example, one preferred embodiment includes means for automatically selecting the number of intervening digital signals to ensure that the time resolution of the measurement exceeds a certain minimum value. In this way, more nearly uniform time resolution and response time are achieved automatically over a wide range of wheel speeds.

The wheel speed sensor of this invention provides several important advantages over sensors of the prior art. Very short response times can be achieved, for only one period of the periodic output of the wheel speed transducer is required to complete a measurement cycle, and no multiple period integration is required. Furthermore, most of the circuit components of this wheel speed sensor are digital circuits and are, therefore, relatively reliable, stable, and compact. In fact, the functions of the counting means can be performed in large part by a general purpose digital processor such as a microprocessor, which can also be used to perform other functions in the brake control system. The output of this wheel speed sensor is a digital value representative of wheel speed or period which is suitable for further digital processing. The only analog to digital conversions which are required are simple 1 bit conversions which can be performed quickly, reliably, and simply.

These and other objects and attendant advantages of the present invention will be better understood by reference to the following detailed description taken in connection with the appended drawings.

DETAILED DESCRIPTION OF PREFERRED EMBODIMENTS

Figure 1:
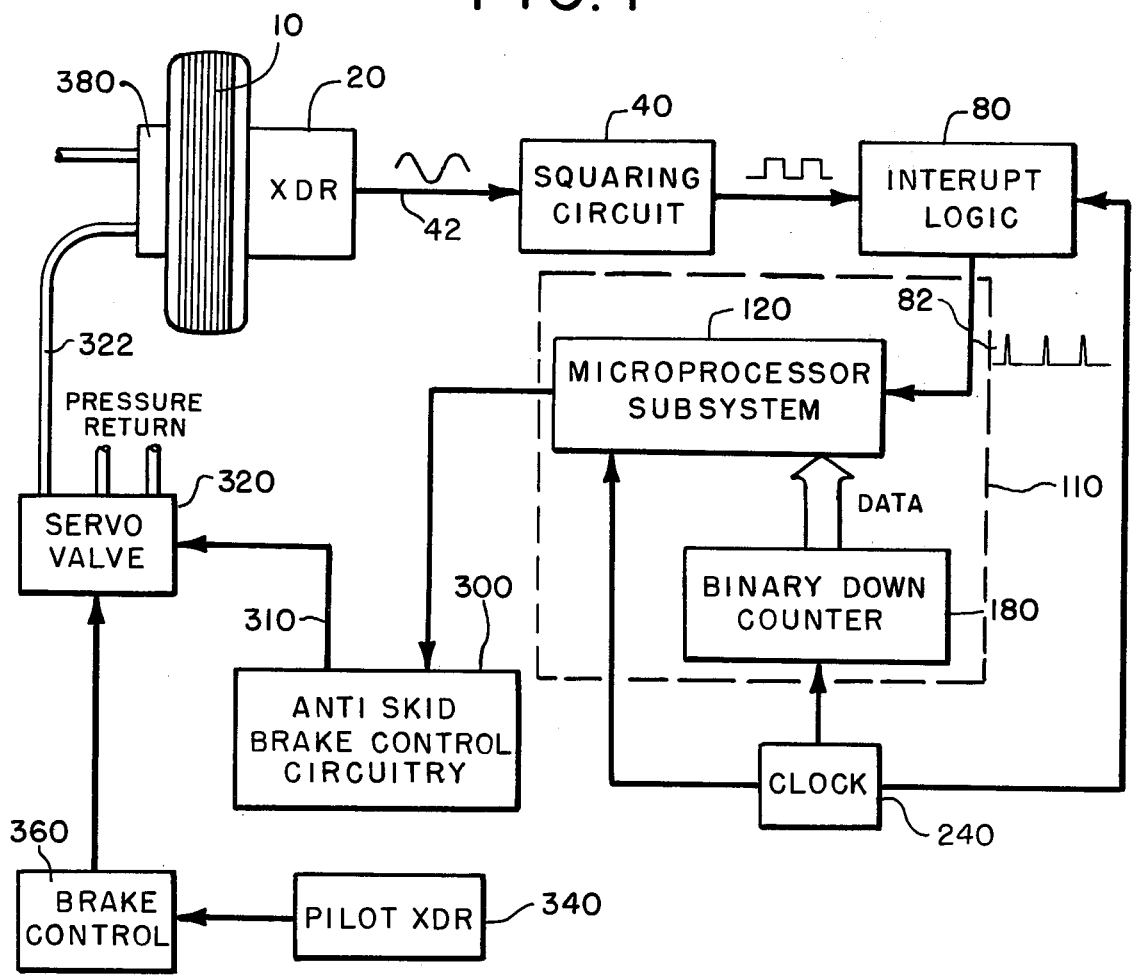
FIG. 1 is a block diagram of a brake control system including a preferred embodiment of the wheel speed sensing system of this invention.

Referring now to the drawings, FIG. 1 shows a schematic representation of a brake control system employing a preferred embodiment of the digital wheel speed sensor of this invention. By way of example, the described brake control system is an antiskid system. It should be understood, however, that the present invention is suitable for use with other brake control systems as well, for example, automatic braking systems. The system of FIG. 1 will first be described in general terms, and then individual components of the system will be described in greater detail.

The braking system of FIG. 1 is a closed loop system in which wheel speed is measured and supplied as an input to antiskid brake control circuitry which in turn alters the braking force applied to the wheel to substantially prevent wheel skidding. The wheel 10 is provided with a wheel speed transducer 20 which supplies a periodic, substantially sinusoidal signal having a frequency proportional to wheelspeed on line 42. This sinusoidal signal is applied to a squaring circuit 40 which generates a square wave having a period equal to that of the sinusoidal output of the transducer 20. This square wave is in turn applied to an interrupt logic circuit 80 which generates a digital signal such as an impulse signal at each positive transition of the square wave above a threshold level. These impulses are then applied via line 82 as interrupt signals to a counting means 110 which includes a microprocessor subsystem 120. This microprocessor 120 is connected to a binary down counter 180 which counts the clock signals generated by a clock 240, which also serves as the microprocessor clock in this embodiment. As will be described below in detail, the microprocessor 120 is programmed to respond to an interrupt from the interrupt logic 80 by reading the counter value stored in the binary down counter 180 at the time of such interrupt.

The elapsed time between two selected interrupt signals is then calculated as the difference between the counter values associated with the two interrupt signals. This elapsed time is proportional to the inverse of the wheelspeed and, after appropriate scaling, is supplied as an input to the antiskid brake control circuitry 300, where it is used in combination with wheelspeed measurements of other wheels and other factors to detect skid conditions and to generate an output signal on line 310 which modulates the brake pressure passed by a servo valve 320 under direction of the pilot via the pilot transducer 340 and the brake control 360. The modulated pressure is supplied via hydraulic line 322 to the brake 380 to supply braking torque to the wheel 10. Though the antiskid brake control circuitry 300 has been shown as a separate block from the microprocessor subsystem 120, it should be understood that it will often be desirable to perform many operations in the microprocessor subsystem 120 which have in the past been performed in analog antiskid brake control circuitry.

Figure 2:
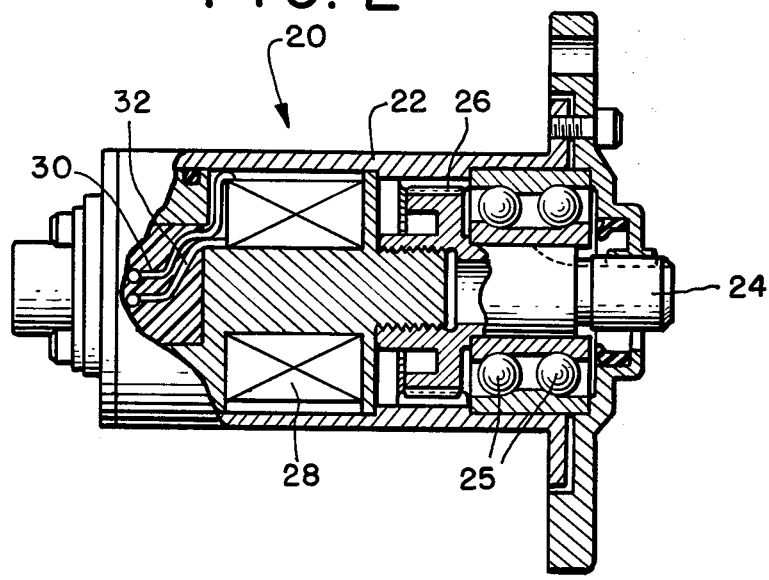
FIG. 2 is a cross-sectional view of the wheel speed transducer of FIG. 1.

Proceeding on to a more detailed description of the major components of this embodiment of the invention, the wheelspeed transducer 20 is shown in greater detail in FIG. 2. There it can be seen that the transducer 20 includes a nonrotating frame 22 which is mounted on a portion of the landing strut (not shown). A rotatable spindle 24 is supported on bearings 25 and is coupled to the wheel 10 so as to rotate with an angular velocity equal to that of the wheel. The spindle 24 includes a regular array of teeth 26. The frame 22 includes a coil 28 with two output leads 30,32.

This transducer 20 is a variable reluctance device which functions in a well known manner to generate a substantially sinusoidal output signal having a frequency proportional to wheelspeed. The relationship between the frequency of the output signal and wheelspeed is a function of the number and spacing of the teeth 26, which should be chosen to provide an output signal having the desired frequency range for the wheel speeds of interest. It has been found that the frequency of the transducer output should preferably remain in the range of about 20 Hz through 4000 Hz for many applications, and the configuration of the teeth 26 should be chosen accordingly for any particular application.

Figure 3:
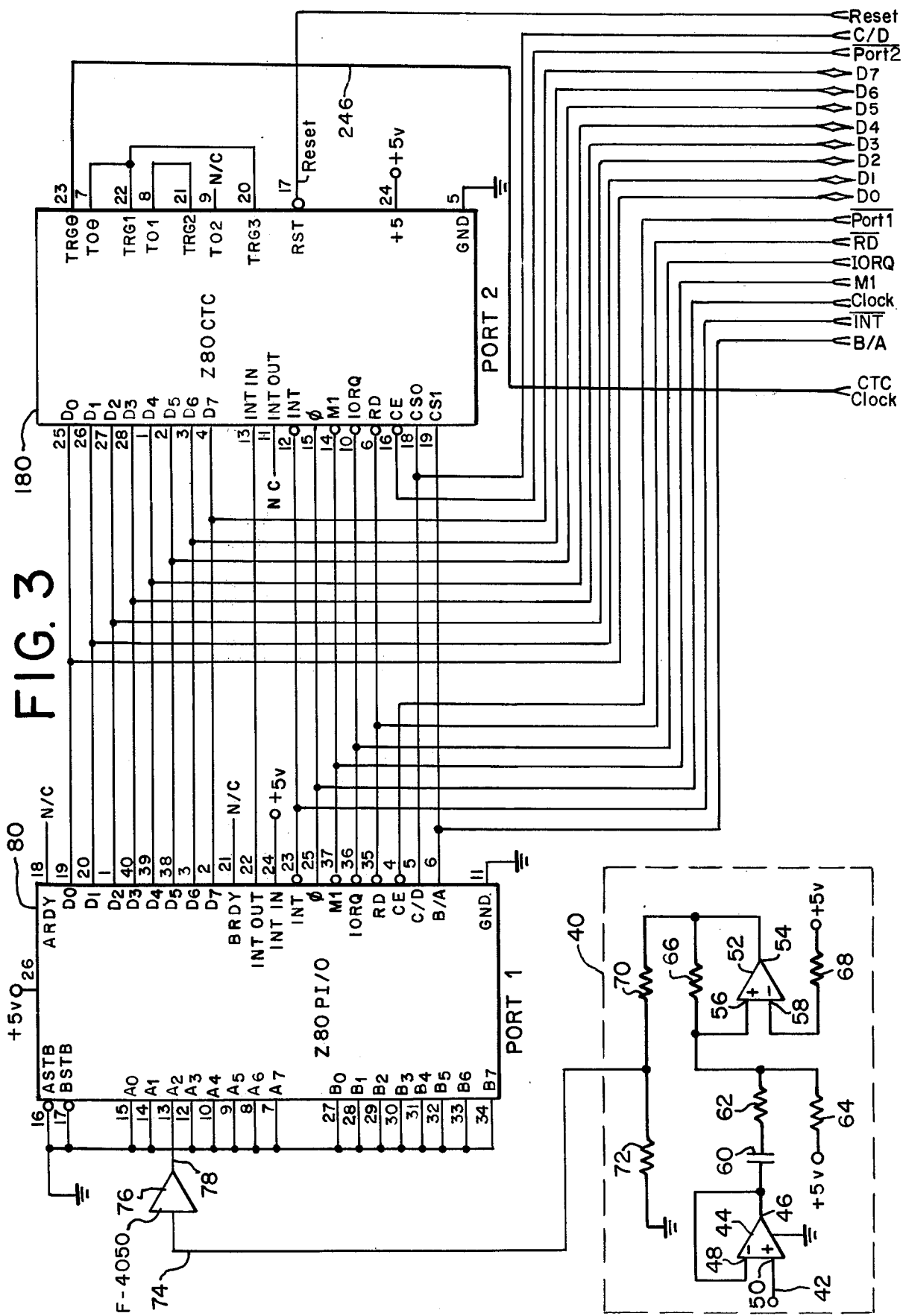
FIG. 3 is a schematic diagram of the squaring circuit, the interrupt logic, and the binary down counter of FIG. 1.
Figure 3A:
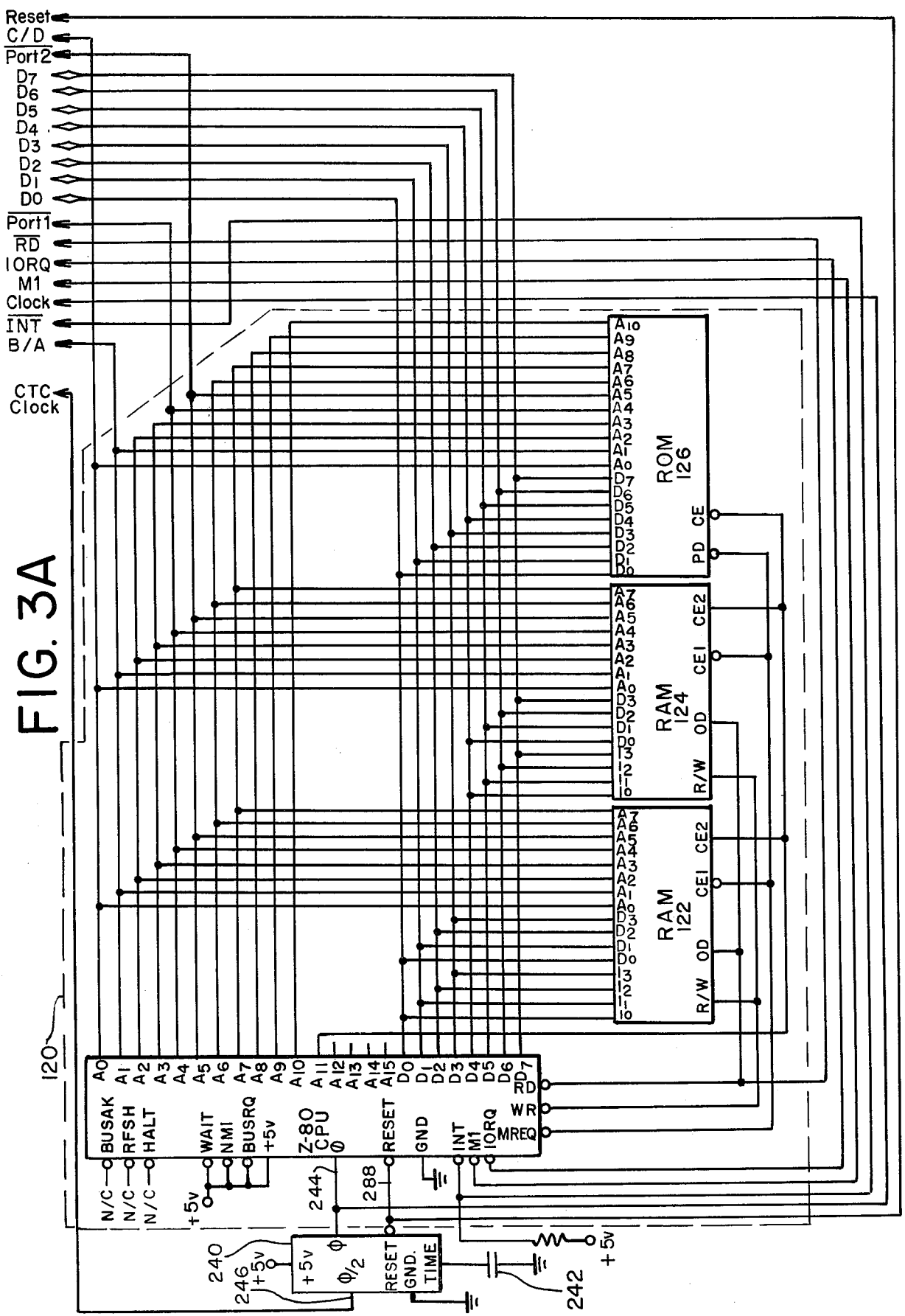
FIG. 3a is a schematic diagram of the microprocessor subsystem of FIG. 1.
Figure 3B:
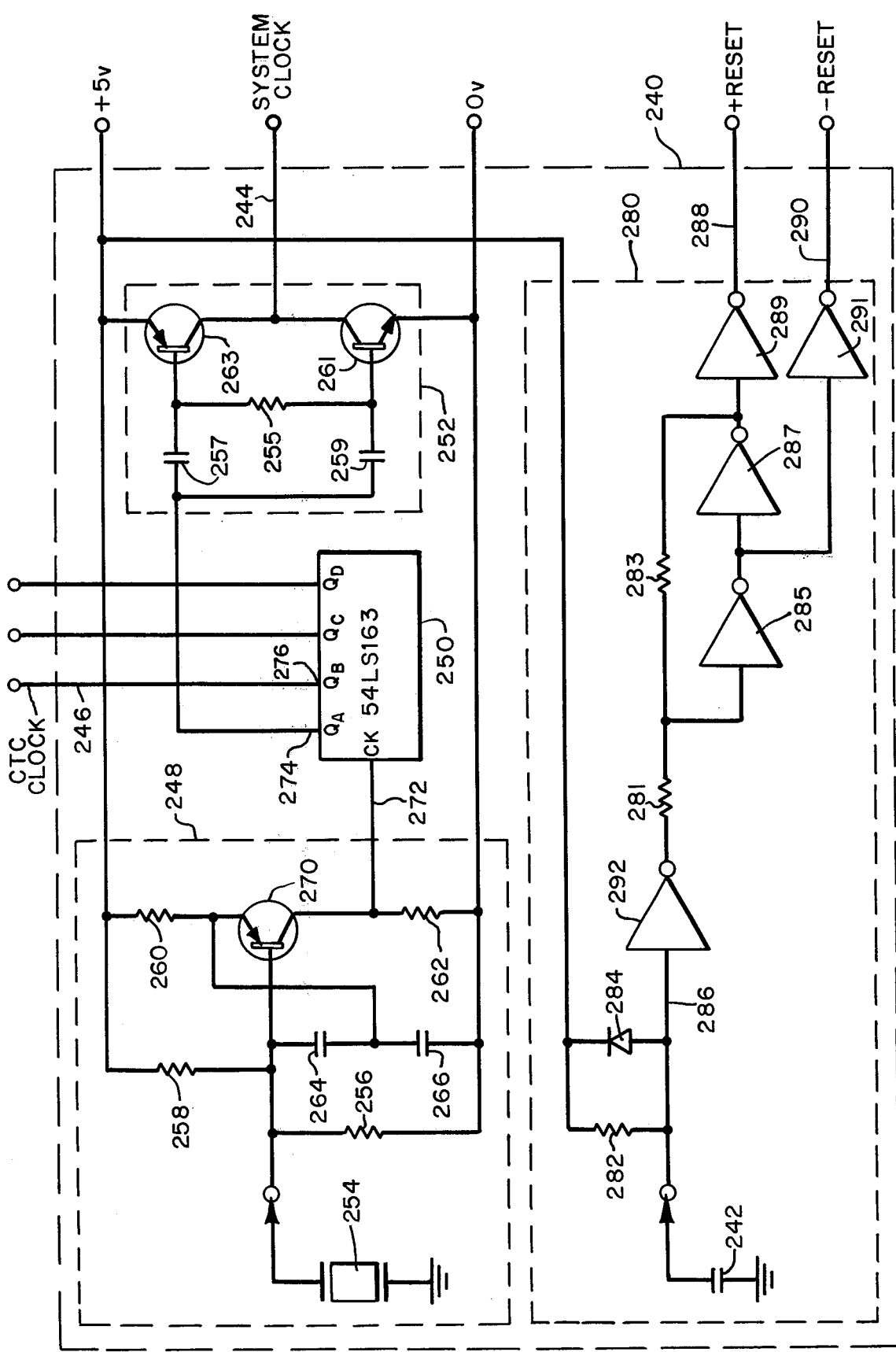
FIG. 3b is a schematic diagram of the clock of FIG. 1.

FIGS. 3, 3a, and 3b together form a detailed schematic drawing of the squaring circuit 40, interrupt logic 80, microprocessor subsystem 120, binary down counter 180, and clock 240 of FIG. 1. These component circuits will be first identified and briefly described, and then the interconnection between the component circuits, the program, and the operation of this embodiment will be described in detail.

The squaring circuit 40 receives the sinusoidal output of the transducer 20 on conductor 42 and supplies a square wave output on conductor 78 having a period equal to that of the input signal. The squaring circuit includes two operational amplifiers 44,52 each having an output 46,54 and a set of differential inputs 48,50 and 56,58, respectively. The signal on conductor 42 is applied to the positive input 50 of the amplifier 44. The output 46 of the amplifier 44 is connected directly to the negative input 48 so that the amplifier 44 functions as a voltage follower. The output of the amplifier 44 is also passed via the capacitor 60 and the resistor 62 to the positive input 56 of the amplifier 52. This input 56 is also connected via the resistor 64 to a 5-volt power supply. The negative input 58 is connected via the resistor 68 to the 5-volt power supply, and the output terminal 54 is connected via the resistor 66 to the positive input 56. This output 54 is also connected via the series resistors 70,72 to ground as shown. A buffer 76 reduces transition times of the signal at the node between the resistors 70,72 and supplies the square wave output signal on the conductor 78. The amplifier 52 is used as a comparator with hysteresis to transform the sinusoidal output of the amplifier 44 to a square wave.

In this preferred embodiment the following components and values are used: National Semiconductor LM-124 Low Power Operational Amplifier (44,52); Fairchild CMOS F 4050/34050 Non Inverting Buffer (76); 10K ohm resistors (62,64,68); 1 M ohm resistor (66); 27K ohm resistor (70); 5.90K ohm resistor (72); 1 micro farad capacitor (60).

The interrupt logic 80 is made up of a Z80-PIO interface circuit. This circuit is manufactured and sold by Zilog, Inc., 10460 Bubb Road, Cupertino, California 95014, and is described in detail in the Z80-PIO Technical Manual, copyrighted 1977 by Zilog, Inc. This Technical Manual, which is hereby incorporated by reference, should be consulted for a detailed description of the use and operating characteristics of the Z80-PIO. Here it is sufficient to state that the Z80-PIO, when programmed as described below, operates to generate an interrupt signal at each positive transition of the square wave signal applied to terminal 13 ($A_2$) of the Z80-PIO via line 78. The INTIN and INTOUT terminals of the Z80-PIO are arranged so that the series of interrupts generated in response to the square wave signal on pin 13 are high priority interrupts which will be promptly and consistently serviced with a minimum delay. In this embodiment the remaining Input/Output terminals of the Z80-PIO ($A_0$–$A_1$, $A_3$–$A_7$, $B_0$–$B_7$) are grounded, and the control and data terminals of the Z80-PIO are connected to the Z80-CPU in the conventional manner as described in the Technical Manual identified above. Also, terminal B/A is connected to address bus line $A_1$; terminal C/D is connected to address bus line $A_0$; and terminal C/E is connected to address bus line $A_5$.

The clock 240, shown in FIG. 3a and in greater detail in FIG. 3b, provides synchronizing signals to each of the digital circuits as well as clock signals to the binary down counter 180. In this embodiment the clock 240 supplies two clock signals: a system clock signal on terminal 244, and a counter clock signal on terminal 246. This clock 240 is made up of three major components: an oscillator circuit 248 designed to oscillate at 5 megahertz, a binary counter 250, and an output stage 252.

The oscillator circuit 248 is a well-known Colpitts type oscillator and thus will not be described in any great detail here. This circuit includes a 5 megahertz piezoelectric quartz crystal 254 which cooperates with the resistors 256–262, the capacitors 264,264, and the transistor 270 to produce a periodic 5.00 megahertz signal on the conductor 272.

The 5.00 megahertz signal on conductor 272 is supplied as a clock input to the binary counter 250 which produces a periodic 2.50 megahertz square wave signal on output terminal 274 and a periodic 1.25 megahertz square wave signal on output terminal 276. The 1.25 megahertz signal is supplied via conductor 246 as a clocking signal to the binary down counter 180. The 2.50 megahertz signal is amplified and shaped by the output stage 252 and is supplied via conductor 244 as a system clock to the microprocessor subsystem 120 and the binary down counter 180, and the interrupt logic 80.

The clock 240 also includes a reset circuit 280 which generates a reset pulse when power is first applied to the system. This reset pulse is applied to the microprocessor subsystem 120 and the binary down counter 180 to ensure proper system startup. The reset circuit 280 includes a capacitor 242 which is connected on one side via a resistor 282 and a diode 284 to the system 5 volt line and on the other side to ground. The capacitor rapidly discharges through the diode 284 when power is removed from the system. Thus, when power is restored, the voltage on the capacitor 242 and the line 286 is low. The reset circuit 280 also includes 5 inverting buffers such as CMOS 4049 integrated circuits which process the signal on line 286 to generate complementary outputs on terminals 288 and 290.

When power is initially applied to the reset circuit, the capacitor 242 is discharged and low and high outputs are generated on terminals 288 and 290, respectively. This condition is maintained until the capacitor 242 is charged to a voltage such that the threshold of the inverting buffer 292 is crossed. At this point the voltage on line 288 goes high and the voltage on line 290 goes low. Thus, a distinctive reset pulse is generated on lines 288 and 290 when power is applied to the system. In this embodiment the value of the resistor 282 is 100K ohms and the capacitor 242 is 1 micro farad to produce a reset pulse lasting somewhat less than 100 milliseconds.

The following components and values are used in the preferred embodiment of FIG. 3b: Standard Crystal Corp. 5.000 megahertz 800 A 32 PJ quartz crystal (254); 27K ohms resistors (256, 258, 255, 283); 300 ohm resistor (262); 510 ohm resistor (260); 22 picofarad capacitor (264); 68 picofarad capacitor (266, 257, 259); 2 N 3906 transistor (270,263); 2 N 3904 transistor (261); 2K ohm resistor (281). In this embodiment the counter 250 is a TTL integrated circuit (54 LS 163).

The binary down counter 180 includes a Z80-CTC programmable counter circuit. This circuit is manufactured and sold by Zilog, Inc., and is described in the Z80-CTC Product Specification dated October, 1977, copyrighted 1977 by Zilog, Inc. This Product Specification is incorporated by reference herein and should be consulted for a detailed description of the use and operating characteristics of the Z80-CTC. When programmed and connected as described below, the Z80-CTC operates as a 16 bit binary down counter which counts down from FFFF (hexadecimal) to zero and then automatically resets to FFFF. The contents of the 16 bit counter can be read at any time by the microprocessor as two separate bytes via data bus lines $D_0$–$D_7$.

The 1.25 megahertz output of the clock 240 is applied to the Trigger/Clock Input (TRG$\theta$) for the Channel 0 counter in the Z80-CTC, where it causes the Channel 0 counter to be decremented at the rate of once every 800 nanoseconds. The Channel 0 Zero Count Terminal (TO$\theta$) is connected to the Trigger Clock Input (TRG1) for Channel 1 such that the Channel 1 counter is decremented each time the Channel 0 counter is decremented to zero. The counters for both Channels 0 and 1 are automatically reset to FF (hexadecimal) immediately following decrementing to zero.

The control terminals of the Z80-CTC are connected in the usual manner with $D_0$–$D_7$ connected to the data bus lines $D_0$–$D_7$. Furthermore, terminal CE is connected to address bus line $A_6$; terminal CS$\phi$ is connected to address bus line $A_0$; and terminal CS1 is connected to address bus line $A_1$.

The microprocessor subsystem 120 includes a Z80-CPU, two Random Access Memory Chips 122,124, and a Read Only Memory Chip 126. The Z80-CPU and the three memory chips are interconnected in the conventional manner, as shown, and the Z80-CPU is strobed by a clock 240. The Z80-CPU is manufactured by Zilog, Inc., and is described in the Z80-CPU Technical Manual (copyrighted 1977 by Zilog, Inc.) and the Z80-CPU Product Specification dated March, 1978 (copyrighted 1977 by Zilog, Inc.), both of which are incorporated by reference herein.

The interconnections between the Z80-CPU and the Z80-CTC and the Z80-PIO have been described above. In addition to the standard connections to the clock 240 and memory chips 122,124,126, three input terminals of the Z80-CPU are tied high (WAIT, NMI, BUSRQ) and three input terminals are not connected (BUSAK, RFSH, and HALT).

The Z80-CPU can be programmed to execute a variety of tasks in measuring wheelspeed and determining proper brake pressure to avoid wheelskids; however, only two of these tasks are important to an understanding of this preferred embodiment. The first of these tasks is setting up the programmable features of the Z80-PIO and the Z80-CTC. In this embodiment this task is performed in a subroutine entitled SETUP. The second task is to measure the number of clock pulses separating a selected pair of interrupt signals. This task is performed in a subroutine entitled WHEELSP.

A program listing and a flow chart for SETUP are presented in Tables I and II, respectively, which describe in comprehensive detail the operations needed to properly program the Z80-PIO and the Z80-CTC. The program instructions used in Tables I, III and V are described in detail in the Z80-CPU Technical Manual. Briefly stated the SETUP subroutine operates to program Channel A of the Z80-PIO to MODE 3, with all port data bus lines as inputs, the interrupt vector set to the lower byte of the address of the WHEELSP subroutine, the interrupt enabled so that an interrupt request is generated only when bit 2 goes high. Thus, an interrupt request is generated at every positive transition of the signal on terminal $A_2$. Channel B of the Z80-PIO is programmed to MODE 3, with all port data bus lines as inputs, the interrupt vector set to a safe address, and the interrupt disabled.

The SETUP subroutine also operates to program both Channels 0 and 1 of the Z80-CTC to the counter mode, with the interrupt disabled, to decrement on a positive edge. Channel 0 is programmed to resume operation after loading a time constant and Channel 1 is programmed to continue counting. Both Channels 0 and 1 are programmed to reset to FF (hexadecimal) after decrementing to zero. The Z80-CTC interrupt vector is set to a safe address.

The second subroutine important to an understanding of this embodiment is the WHEELSP subroutine, which is listed in Table III and flowcharted in Table IV. This subroutine is automatically executed whenever an interrupt request signal is generated by Channel A of the Z80-PIO, that is, at each positive transition of the square wave output of the squaring circuit 40 the Z80-CPU is interrupted from its current activity and the WHEELSP subroutine is entered.

The program listing should be consulted for a detailed understanding of the operation of WHEELSP. In brief, this subroutine reads the contents of the Channel 0 and Channel 1 counters of the Z80-CTC at each interrupt. Together these two counters form a 16 bit counter which measures time in 800 nanosecond intervals. The difference between any two 16 bit counter readings is a measure of the elapsed time between the two readings, and consequently, between the two interrupts.

Of course, care should be taken to ensure that at least one interrupt is generated and that the counter is read at least once in every cycle of the 16 bit counter. Otherwise, erroneous readings may result. In this embodiment the cycle time of the counter is somewhat greater than 50 milliseconds. ($0.8 \times 10^{-6}$ sec. multiplied by 65.536 is greater than 52 milliseconds.) This sets the lower limit of operation of this embodiment at about 20 hertz, and the transducer 20 should be designed accordingly. Of course, other embodiments of the counter 180 may incorporate a greater or lesser number of bits and the clock 240 may be chosen to provide a faster or slower clock rate in order to accommodate transducer signals having other frequency ranges.

The WHEELSP subroutine of Table III utilizes a variable, TEETH, to determine the interval at which the counter is read. After each counter reading, the variable STATUS is set equal to TEETH. Then, at each successive interrupt, STATUS is decremented, and the counter is next read only after STATUS is decremented to zero. Thus, if TEETH is equal to 4, as in the listing of Table III, the counter will be read only at every fourth interrupt. That is, three intervening interrupt signals will separate the pair of interrupt signals at which the counter is read. By adjusting the value of TEETH the time resolution of the time interval, that is, the approximate number of clock pulses in the measured time interval, can be adjusted for a particular frequency transducer signal. The valve of TEETH affects the frequency range of the wheel speed sensor.

For example, with TEETH equal to 4 the lower limit on transducer frequency is about 80 hertz.

Another feature of WHEELSP is that the counter is read as two successive 8 bit bytes and that the 16 bit reading is compensated for the time delay in reading the second byte. This compensation is needed to correct for possible reading errors resulting from the delay in reading the second byte. For example, if the low order byte is equal to 01 when read, it will have been decremented to zero and have triggered a decrement in the high order byte before the high order byte is read by the Z80-CPU. In order to ensure accuracy, the 16 bit reading is arithmetically compensated for the delay in reading the second byte.

The compensated reading is then subtracted from the previous compensated reading to arrive at a difference integer representative of the period of the transducer signal. This difference is stored as the variable WHLSPD and the newly measured compensated reading is stored for use in calculating the next time interval. Finally, a flag is set indicating the new wheel speed information is available.

Thus, the sensor of this embodiment supplies two data variables: WHLSPD indicating the time difference between the two counter readings, and TEETH indicating the number of transducer cycle periods occurring between the two counter readings. Further processing can use the variables WHLSPD, TEETH, and appropriate scaling constants to arrive at a measure of the period of the transducer signal. Wheel velocity is proportional to the inverse of this period. Such further processing is outside the scope of this invention and will not be described in detail here.

Tables V and VI present the program listing and flow chart for an alternate embodiment of the WHEELSP subroutine, one which automatically alters the frequency at which the counter is read in order to control the time resolution of the measurement. This alternate embodiment of Tables V and VI is similar to the embodiment to Tables III and IV, and the same variable names are used in several cases. These common variables serve analogous functions in the two routines and will not be described again here.

This embodiment differs from the embodiment of Tables III and IV in that the counter is read and the counter reading is compensated at each interrupt. The compensated reading is then compared with a previously stored counter reading INSTIM. If the difference between these two readings is less than a preselected constant, SPD1, then the STATUS variable is incremented, WHLSPD is not updated, the new data flag is not set, and INSTIM is left unchanged.

When, at the next interrupt triggered by the transducer signal, the routine is entered the next time, the counter is again read, compensated, and compared with the value stored in INSTIM. This goes on until the difference exceeds the constant SPD1, at which time the counter difference is stored in WHLSPD, STATUS is stored in STAT1, STATUS is reset to 1, the current compensated counter reading is stored in INSTIM, and the data ready flag is set.

This alternate embodiment ensures that a preselected time resolution is achieved with each measurement interval, that is with each measurement of counter difference stored in WHLSPD. In the above example SPD1 is set to 1000 (hexadecimal), or 4096 decimal. This ensures that the time resolution is better than 0.025% for each time measurement. The desired minimum resolution can be readily obtained by setting SPDI to the appropriate value. In general, it has been found that it is often preferable to ensure at least 1500 decimal clock pulses in each time interval measurement.

A further advantage of this embodiment is that it ensures that the time interval measurement is made promptly after the desired time resolution is achieved. This automatically permits maximum spatial resolution consistent with the desired time resolution. Thus, time resolution and response time are held nearly constant for a wide range of wheel speeds. The STAT1 variable provides the scaling information needed to properly correct the counter difference stored in WHLSPD to arrive at an accurate measure of the period of the signal generated by the transducer 20.

Of course, it should be understood that various changes and modifications to the preferred embodiments described herein will be apparent to those skilled in the art. For example, the counting means of the wheelspeed sensor of this invention may be hard wired as a single purpose digital circuit instead of using a programmable microprocessor. Furthermore, a single counting means may be multiplexed to measure the period of a number of wheel speed transducers. Such changes and modifications can be made without departing from the scope of the present invention and without diminishing its attendant advantages. It is, therefore, intended that such changes and modifications be covered by the following claims.

TABLE 1
PORT SETUP SUB ROUTINE PROGRAM LISTING

```
SETUP    IM 2 ; INTERRUPT MODE 2 (VECTOR)
;
; PORT 1A
         LD A,OFFH; MODE 3 OPERATION
         OUT (DECCNT),A
         LD A,OFFH; INPUT BITS (ALL INPUT)
         OUT (DECCNT),A
         LD HL,VECT5; VECTOR FOR WHEEL SPEED SUBROUTINE
         LD A,L
         OUT (DECCNT),A
         LD A,OB7H; INTERRUPT CONTROL (ENABLE INTERRUPTS,
;        OR, HIGH, MASK FOLLOWS)
         OUT(DECCNT),A
         LD A,OFBH; INTERRUPT MASK (BIT 2 SELECTED)
         OUT (DECCNT),A
;
; PORT 1B
;
         LD A,OFFH; MODE 3 OPERATION
         OUT (ACTCNT),A
         LD A,OFFH; INPUT BITS (ALL INPUT)
         OUT (ACTCNT),A
         LD HL,VECT1; VECTOR FOR NO ROUTINE- RETURN
         LD A,L
         OUT (ACTCNT),A
         LD A,7H; INTERRUPT CONTROL (DISABLE INTERRUPTS)
         OUT (ACTCNT),A
;
; PORT 2   (CTC)
;
         LD HL,VECT1
         LD A,L
         OUT (CTC0),A
         LD A, 57H; CONTROL FOR CTC0
         OUT (CTC0),A
         LD A,O; TIME CONSTANT FOR CTC0 (256)
         OUT (CTC0),A

LD A,55H; CONTROL FOR CTC1
         OUT (CTC1),A
         LD A,O; TIME CONSTANT (256)
         OUT (CTC1),A
;
         RETI
;
VECT1    DEFW RETNX
VECT5    DEFW WHEELSP
DECCNT   EQU 61H;
ACTCNT   EQU 63H;
CTC0     EQU 50H; CTC CIRCUIT, LOWEST BYTE
CTC1     EQU 51H; CTC CIRCUIT, 2 ND BYTE
```

TABLE II
PORT SETUP SUBROUTINE FLOW CHART

Start.
Set Interrupt Mode to 2.
Set Operating Mode Word of Z80-PIO Channel A to 11111111 (Mode 3).
Set all port data bus lines of Z80-PIO Channel A to inputs.
Set Interrupt Vector of Z80-PIO Channel A to lower byte of the address of WHEELSP subroutine.
Set Interrupt Control Word of Z80-PIO Channel A to 10110111 (Enable Interrupt, Logical OR, High, Mask Follows).
Set mask of Z80-PIO Channel A to 11111011 (Only Bit 2 selected).

Set Operating Mode Word of Z80-PIO Channel B to 11111111 (Mode 3).
Output 11111111 to set all port data bus lines of Z80-PIO Channel B to inputs.
Set Interrupt Vector of Z80-PIO Channel B to lower byte of a safe interrupt address.
Set Interrupt Control Word of Z80-PIO Channel B to 00000111 (Disable Interrupt).
Set Interrupt Vector of Z80-CTC with safe interrupt address.
Set Operating Mode of Channel 0 of Z80-CTC to 01010111 (Disable interrupt, Counter Mode, Positive Edge, Time Constant, Continue counting after loading time constant).
Set Time Constant of Channel 0 of Z80-CTC to 00000000 (256 decimal).
Set Operating Mode of Channel 1 of Z80-CTC to 01010101 (Disable Interrupt, Counter Mode, Positive Edge, Time Constant, Continue counting).
Set Time Constant of Channel 1 of Z80-CTC to 00000000 (256 decimal).
Return.

TABLE III

; WHEEL VELOCITY MEASUREMENT SUBROUTINE PROGRAM LISTING

```
;
;
; ENTRY HERE IS VIA VECTOR INTERRUPT, VELOCITY IS
; 16 BIT NUMBER.
; OPERATION: POSITIVE TRANSITION OF WHEEL XDCR
; CAUSES INTERRUPT AND THIS ROUTINE IS ENTERED.
; MOMENTARY COUNT IN THE CTC CIRCUIT (TWO BYTES)
; IS READ AND STORED IN "INSTIM" MEMORY, TWO BYTES.
; NEXT POSITIVE TRANSITION OF XDCR CAUSES ANOTHER ENTRY,
; COUNT IN CTC CIRCUIT IS READ IN, SUBTRACTED FROM
; PREVIOUS COUNT IN "INSTIM" AND DIFFERENCE SAVED IN
; "WHLSPD" AS A VELOCITY INDICATION (TIME PERIOD AT THIS POINT).
; "COMMX" MEMORY IS SET TO ODDH TO INDICATE THAT NEW
; VELOCITY INFO IS AVAILABLE.
; "STATUS" IS USED AS A TEETH COUNTER. IF VALUE
; "TEETH" IS GREATER THAN 1, THIS COUNTER IS DECREMENTED
; ONCE FOR EACH INTERRUPT AND NEW VELOCITY INFO IS
; AVAILABLE ONLY WHEN "STATUS" IS ZERO. AT THIS TIME
; NEW VALUE OF "TEETH" IS LOADED TO "STATUS".

WHEELSP    DI; DISABLE INTERRUPTS
           PUSH AF
           PUSH HL
           LD HL,STATUS
           DEC (HL)
           JR NZ, WHEELA
           PUSH DE
           PUSH BC
           LD C,CTC0
           IN A,(C); GET LOW BITS COUNT
           INC C
           IN D,(C); GET HIGH BITS COUNT
           SUB COMPEN; COMPENSATE FOR DELAY BETWEEN READINGS
           LD E,A; COMPENS VALUE IN DE
           LD A,TEETH; LOAD NEW TEETH COUNT
           LD (HL),A
           XOR A; CLEAR CARRY
           LD HL,(INSTIM)
           LD (INSTIM),DE; SAVE NEW TIME
           SBC HL,DE; GET DIFFERENCE (POS.,ABSOL. VALUE)
           LD (WHLSPD),HL
           LD A,ODDH
           LD (COMMX),A; NEW SPEED STATUS
           POP BC
           POP DE
WHEELA     POP HL
           POP AF
           EI
           RETI
;
;
;

;CONSTANTS
;
CTC0       EQU 50H;    CTC CIRCUIT, LOWEST BYTE
COMMX      EQU 8;      COMPENS FOR TIME BETWEEN READINGS OF
                       CTC0 AND CTC1
TEETH      EQU 4;      NUMBER OF TEETH PER MEASUREMENT

;MEMORY ASSIGNMENTS
WHLSPD     EQU 80BH;   COMBINED, FILTERED SPEED (TWO BYTES)
STATUS     (EQU 812H;  STATUS FOR VEL CONVERT (TWO BYTES)
```

TABLE III-continued

WHEEL VELOCITY MEASUREMENT SUBROUTINE PROGRAM LISTING

| | | |
|---|---|---|
| INSTIM | EQU 814H; | FORMER COUNTER VALUE (TWO BYTES |

TABLE IV

WHEEL VELOCITY MEASUREMENT SUBROUTINE FLOW CHART

Start.
Disable Interrupts.
Store AF and HL in Stack.
Decrement "STATUS" and if "STATUS"
is not equal to zero, go to EXIT.
Store DE and BC in Stack.
Read low and high byte of counter (CTC0 and CTC1)
Subtract constant from reading to compensate
for delay between reading the two bytes.
Set "STATUS" equal to "TEETH".
Load previous counter reading (2 bytes)

TABLE IV-continued

WHEEL VELOCITY MEASUREMENT SUBROUTINE FLOW CHART into temporary register.
Store compensated current counter reading.
Get the absolute value of the difference between
the current and previous counter reading.
Store the counter difference.
Set flag indicating new counter difference available.
Restore BC and DE from Stack.
EXIT  Restore HL and AF from Stack.
Enable Interrupts.
Return.

TABLE V

ALTERNATE WHEEL VELOCITY MEASUREMENT SUBROUTINE PROGRAM LISTING

```
;   ENTRY HERE IS VIA VECTOR INTERRUPT. VELOCITY IS
;   16 BIT NUMBER.
;   OPERATION: POSITIVE TRANSITION OF WHEEL XDCR
;   CAUSES INTERRUPT AND THIS ROUTINE IS ENTERED.
;   MOMENTARY COUNT IN THE CTC CIRCUIT (TWO BYTES)
;   IS READ AND STORED IN "INSTIM" MEMORY, TWO BYTES.
;   NEXT POSITIVE TRANSITION OF XDCR CAUSES ANOTHER ENTRY,
;   COUNT IN CTC CIRCUIT IS READ IN, SUBTRACTED FROM
;   PREVIOUS COUNT IN "INSTIM" and DIFFERENCE COMPARED WITH
;   MINIMUM VALUE TO OBTAIN GOOD RESOLUTION. IF VALUE IS TOO
;   LOW, TOOTH COUNT IS INCREMENTED AND EXIT MADE WITHOUT
;   NEW VELOCITY INFO. WHEN VALUE IS ABOVE THE MINIMUM,
;   THE TOTAL DIFFERENCE IS USED TO CALCULATE VELOCITY
;   ALONG WITH VALUE IN THE TOOTH COUNTER, WHICH IS THEN
;   RESET FOR NEW MEASUREMENT.
;   "COMMX" MEMORY IS SET TO ODDH TO INDICATE THAT NEW
;   VELOCITY INFO IS AVAILABLE.
;   "STATUS" IS USED AS A TOOTH COUNTER.
WHEELSP DI; DISABLE INTERRUPTS
        PUSH AF
        PUSH HL
        PUSH DE
        PUSH BC
        LD C,CTC0
        IN A,(C); LOW BYTE
        INC C
        IN D,(C); HIGH BYTE
        SUB COMPEN
        LD E,A
        PUSH DE
        LD HL,(INSTIM)
        AND A; CLEAR CARRY
        SBC HL,DE; GET DIFFERENCE
        EX DE,HL; TIME INTO DE
        LD HL, SPD1; FIRST SCALE
        AND A
        SBC HL,DE
        LD HL,STATUS
        JR C,WHEELA; TIME ABOVE MINIMUM
        INC (HL); INCREMENT TOOTH COUNT
        POP DE; BALANCE STACK
        JR WHEELB
WHEELA  LD A,(HL); GET TOOTH COUNT
        LD (STAT1),A; AND SAVE AS SCALE
        LD (HL),1; NEW TOOTH COUNTER
        LD (WHLSPD),DE; SAVE NEW SPEED
        POP HL; GET NEW COUNT
        LD (INSTIM), HL; SAVE
        LD A,ODDH; SPEED STATUS
        LD (COMMX),A
WHEELB  POP BC
        POP DE
        POP HL
        POP AF
        EI
```

TABLE V-continued

ALTERNATE WHEEL VELOCITY MEASUREMENT SUBROUTINE PROGRAM LISTING

```
            RETI

;CONSTANTS
;
CTC0        EQU 50H;      CTC CIRCUIT, LOWEST BYTE
COMPEN      EQU 8;        COMPENS FOR TIME BETWEEN READINGS OF
;                         CTC0 AND CTC1
SPD1        EQU 1000H;    SPEED SCALE
;MEMORY ASSIGNMENTS
WHLSPD      EQU 80BH;     COMBINED, FILTERED SPEED (TWO BYTES)
STATUS      EQU 812H;     STATUS FOR VEL CONVERT (TWO BYTES)
INSTIM      EQU 814H;     FORMER COUNTER VALUE (TWO BYTES)
STAT1       EQU 828H;     TEMPORARY STORAGE FOR TOOTH COUNT
COMMX       EQU 825H;     STATUS OF WHEEL SPEED
```

TABLE VI

ALTERNATE WHEEL VELOCITY MEASUREMENT SUBROUTINE FLOW CHART

|  |  |
|---|---|
|  | Start. |
|  | Disable Interrupts. |
|  | Store AF, HL, DE, BC in Stack. |
|  | Read low and high byte of counter to obtain current counter reading (CTC0 and CTC1). |
|  | Subtract constant from counter reading to compensate for delay between reading the bytes. |
|  | Store compensated counter reading in Stack. |
|  | Subtract compensated counter reading from previous reading to obtain current counter difference. |
|  | Compare current counter difference with preset minimum difference; if current counter difference is less than preset minimum difference, then increment tooth count, restore DE from stack and go to WHEELB. |
|  | If current difference is greater than preset minimum difference, then store tooth count as scale factor, set tooth count equal to 1, save current counter difference and compensated counter reading and set flag indicating new counter difference available. |
| WHEELB | Restore BC, DE, HL, AF from Stack. |
|  | Enable interrupts. |
|  | Return. |

I claim:

1. An apparatus for measuring the rotation of a rotatable wheel in a brake control system, said apparatus comprising:
   means for generating a periodic series of digital signals, said series having a frequency related to wheel speed;
   clock means for generating a series of clock signals;
   means responsive to the clock means and to the series of digital signals for counting the number of clock signals generated during each of a sequence of measurement intervals, each of said measurement intervals corresponding in duration to the time interval separating a pair of digital signals, said sequence of measurement intervals being substantially contiguous in time.

2. The apparatus of claim 1 further including means for selecting the number of intervening digital signals falling between each pair of digital signals.

3. The apparatus of claim 2 wherein the selecting means includes means for automatically increasing the number of intervening digital signals when the frequency of the series of digital signals is higher than a first value and means for automatically decreasing the number of intervening digital signals when the frequency of the series of digital signals is lower than a second value.

4. The apparatus of claim 2 wherein the selecting means includes means for automatically determining the number of intervening digital signals to ensure that the number of clock signals counted during each measurement interval is greater than a preselected value.

5. An apparatus for measuring the rotation of a rotatable wheel in a brake control system, said apparatus comprising:
   means, responsive to rotation of the wheel, for generating a series of interrupt signals having a period inversely related to wheel speed, said series of interrupt signals including a plurality of selected interrupt signals;
   clock means for generating a series of clock signals;
   counter means responsive to the clock means for maintaining a count of the clock signals;
   circuit means, responsive to the selected interrupt signals and the counter means, for reading and storing the count after each selected interrupt signal and for obtaining the difference between the counts associated with each pair of adjacent selected interrupt signals for use as digital measures of the period of wheel rotation.

6. The apparatus of claim 5 wherein the circuit means includes means for selecting the number of intervening interrupt signals falling between adjacent selected interrupt signals.

7. The apparatus of claim 6 wherein the selecting means includes means for automatically increasing the number of intervening interrupt signals when the period of the series of interrupt signals is shorter than a first value and means for automatically decreasing the number of intervening interrupt signals when the period of the series of interrupt signals is longer than a second value.

8. The apparatus of claim 6 wherein the selecting means includes means for automatically determining the number of intervening interrupt signals to ensure that the difference between the counts associated with adjacent selected interrupt signals is greater than a preselected value.

9. An apparatus for measuring rotation of a rotatable wheel in a brake control system, said apparatus comprising:
   means for generating a series of impulses, said series of impulses having a period inversely related to wheel speed;
   clock means for generating a series of clock signals;

means, responsive to the series of impulses and the clock signals, for counting the number of clock signals generated during a time period corresponding to the time interval between a pair of impulses; and means for automatically selecting the number of intervening impulses falling between the pair of impulses such that the number of intervening impulses is set at a first value when the period of the series of impulses is in an upper range of time intervals and the number of intervening impulses is set at a second, higher value when the period of the series of impulses is in a lower range of time intervals.

10. The apparatus of claim 9 wherein the selecting means includes means for automatically determining the number of intervening impulses to ensure that the number of clock signals counted during the time period corresponding to the time interval between the pair of impulses is greater than a preselected value.

11. An apparatus for measuring the rotation of a rotatable wheel in a brake control system, said apparatus comprising:

means, responsive to rotation of the wheel, for generating a series of digital signals having a period inversely related to wheel speed, said series of digital signals including a plurality of selected digital signals including first, second and third selected digital signals;

clock means for generating a series of clock signals;

counter means responsive to the clock means for maintaining a count of the clock signals;

means for reading and storing first and second counts associated with the first and second selected digital signals, respectively;

means for obtaining the difference between the first and second counts for use as a digital measure of the period of wheel rotation;

means for reading and storing a third count associated with the third selected digital signal;

means for obtaining the difference between the second and third counts for use as a digital measure of the period of wheel rotation; and means for selecting the number of intervening digital signals falling between adjacent selected digital signals to ensure that the difference between the first and second counts and the difference between the second and third counts are both greater than a preselected value.

* * * * *

UNITED STATES PATENT AND TRADEMARK OFFICE
CERTIFICATE OF CORRECTION

PATENT NO. : 4,184,203
DATED : January 15, 1980
INVENTOR(S) : Thomas Skarvada

It is certified that error appears in the above-identified patent and that said Letters Patent are hereby corrected as shown below:

Column 1, line 51, delete "spped" and insert therefor --speed--;

Column 2, line 10, delete "measure" and insert therefor --measured--;

Column 5, line 17, delete "264,264" and insert therefor --264,266--;

Column 7, line 67, delete "valve" and insert therefor --value--;

Column 10, line 25, delete ";     LD A,OFFH; MODE 3 OPERATION" and insert therefor --     LD A,OFFH; MODE 3 OPERATION--;

Column 13, line 5, delete "BYTES" and insert therefor --BYTES)--.

Signed and Sealed this

Eleventh Day of November 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,184,203
DATED : Jan. 15, 1980
INVENTOR(S) : Thomas Skarvada

It is certified that error appears in the above—identified patent and that said Letters Patent is hereby corrected as shown below:

Column 6, line 30, delete "$A_6$", and insert therefor --$A_5$--.

Column 7, line 45, delete "65536" and insert therefor --65,536--.

Column 7, line 67, delete "valve" and insert therefor --value--.

Signed and Sealed this

Fifth Day of July 1983

[SEAL]

Attest:

Attesting Officer

GERALD J. MOSSINGHOFF
Commissioner of Patents and Trademarks